United States Patent
Greenspan et al.

(10) Patent No.: US 9,628,459 B2
(45) Date of Patent: Apr. 18, 2017

(54) SECURE DATA TRANSMISSION USING MULTI-CHANNEL COMMUNICATION

(71) Applicants: Steven L. Greenspan, Scotch Plains, NJ (US); James Donald Reno, Scotts Valley, CA (US); Ralf Dieter Saborowski, Leichlingen (DE); Charley Chell, San Jose, CA (US)

(72) Inventors: Steven L. Greenspan, Scotch Plains, NJ (US); James Donald Reno, Scotts Valley, CA (US); Ralf Dieter Saborowski, Leichlingen (DE); Charley Chell, San Jose, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/218,345

(22) Filed: Mar. 18, 2014

(65) Prior Publication Data
US 2015/0271163 A1 Sep. 24, 2015

(51) Int. Cl.
*H04L 29/06* (2006.01)

(52) U.S. Cl.
CPC .......... *H04L 63/08* (2013.01); *H04L 63/0428* (2013.01); *H04L 63/18* (2013.01)

(58) Field of Classification Search
CPC .............................. H04L 63/08; H04L 63/0428
USPC ......................................................... 713/168
See application file for complete search history.

(56) References Cited

U.S. PATENT DOCUMENTS

| | | | |
|---|---|---|---|
| 5,708,422 A | 1/1998 | Blonder et al. | |
| 6,182,214 B1* | 1/2001 | Hardjono | 713/163 |
| 7,002,942 B2* | 2/2006 | Kotzin | 370/338 |
| 7,318,098 B2* | 1/2008 | Steinberg et al. | 709/227 |
| 7,948,933 B2 | 5/2011 | Ohayon et al. | |
| 8,284,717 B2* | 10/2012 | Voyer et al. | 370/328 |
| 8,620,365 B2* | 12/2013 | Hunziker | 455/466 |
| 9,020,121 B1* | 4/2015 | Dhanda | H04M 3/42 379/127.06 |
| 2005/0076216 A1* | 4/2005 | Nyberg | H04L 9/0844 713/171 |
| 2013/0042105 A1* | 2/2013 | Orsini et al. | 713/157 |

OTHER PUBLICATIONS

Banyal et al. (Multi-factor Authentication Framework for Cloud Computing, IEEE 2013, pp. 105-110).*

(Continued)

*Primary Examiner* — Oleg Korsak
(74) *Attorney, Agent, or Firm* — Baker Botts L.L.P.

(57) ABSTRACT

A method includes receiving a request to initiate secure communications from a first client and authenticating the first client. The authenticating includes communicating with a second client using a second communication channel, and receiving a response from the first client, the response being transmitted over a first communication channel. The method also includes receiving a first set of message data from the first client, the first set of message data being transmitted over the first communication channel, and receiving a second set of message data from the second client, the second set of message data being transmitted over the second communication channel. The method additionally includes constructing the message using the first set of message data and the second set of message data.

20 Claims, 4 Drawing Sheets

(56) References Cited

OTHER PUBLICATIONS

Lee, et al.(Two Factor Authentication for Cloud Computing, International Journal of Kimics, vol. 8, No. 4, Aug. 2010, pp. 427-432).*
Karan et al. (Man in the middle attacks for Out of band Authentication, 2013, 2 pages).*
Katti et al. (Information Slicing: Anonymity Using Unreliable Overlays, NSDI'07, 2007, 14 pages).*
Balfanz, et al. (Talking to strangers: Authentication in ad-hoc wireless networks, 2002, 13 pages).*

* cited by examiner

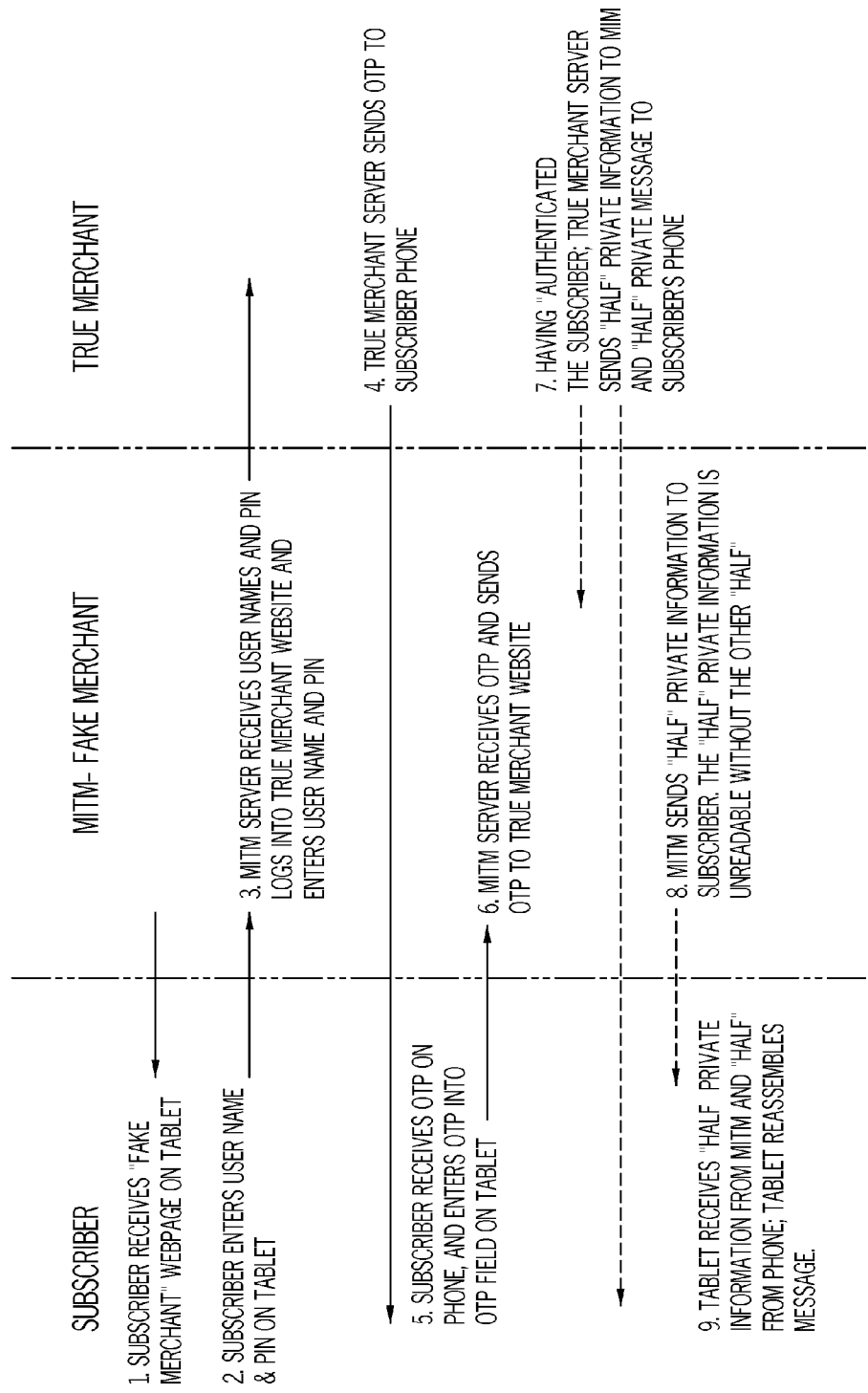

SECURE DATA TRANSMISSION USING MULTI-CHANNEL COMMUNICATION

BACKGROUND

The disclosure relates generally to secure data transmission, and more specifically, to secure data transmission using multi-channel communication.

SUMMARY

According to one embodiment of the disclosure, a method includes receiving a request to initiate secure communications from a first client, the request being transmitted over a first communication channel, wherein the secure communications comprise a message stored in a memory of the first client. The method also includes authenticating the first client. The authenticating includes communicating with a second client using a second communication channel, and in response to communicating with the second client, receiving a response from the first client, the response being transmitted over the first communication channel. The method additionally includes receiving a first set of message data from the first client, the first set of message data being transmitted over the first communication channel, wherein the message cannot be determined using the first set of message data alone. The method still further includes receiving a second set of message data from the second client, the second set of message data being transmitted over the second communication channel, wherein the message cannot be determined using the second set of message data alone. The method further includes constructing, using a processor, the message using the first set of message data and the second set of message data.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

FIG. 4 illustrates a sequence diagram of a system for secure data transmission using multi-channel communications in accordance with a non-limiting embodiment of the present disclosure.

DETAILED DESCRIPTION

Figure 1:
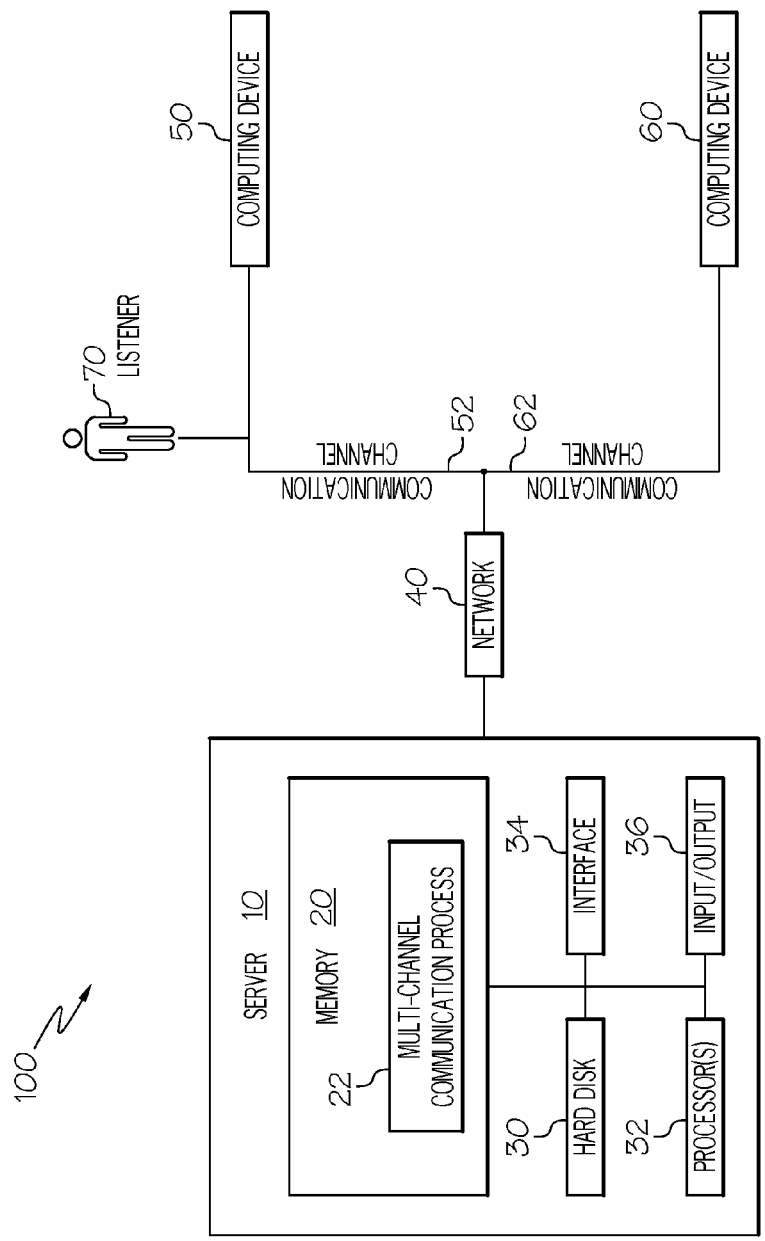
FIG. 1 illustrates a block diagram of a system for secure data transmission using multi-channel communication in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Secure communication networks are used in a variety of business settings to transmit and receive sensitive data and documents. For example, an online shopper may enter their credit card information to pay for merchandise from a retailer. The retailer may need to authenticate the user or credit card in order to accept payment. As another example, an organization may host a private network that allows users access to email, applications, cloud based resources, services, and documents. The organization may use authentication techniques to ensure that the private network is only available to properly authenticated users.

Some authentication techniques may include requiring a user to log in to a machine physically connected to an internal network using windows authentication. Some organizations may also permit off-site employees to access the network using other authentication techniques. For example, an organization may provide a web-authentication interface for remote users to log in to a private network. Once the remote user is authenticated, they are granted access to the private network. All communications between the remote user and the private network may be transmitted on a private connection and may be enciphered or encrypted. While these communications may be secured with the latest encryption technology, they may still be susceptible to attacks by hackers who are constantly catching up to and often advancing the latest commercial cryptographic techniques.

For example, a hacker may conduct a man in the middle ("MITM") attack by eavesdropping on private communications by impersonating each counterparty in the private communication network. If the hacker receives the public key as part of an initial communication, the hacker may then decrypt all the information passed between the endpoints, while providing the appearance of a secure communication network. Such attacks may be highly effective and difficult to detect.

The teachings of the present disclosure may enable secure authentication techniques and subsequent secure transmission of private information by utilizing multiple existing communication channels. The data may be sent over two or more communication channels and then be reconstructed at each endpoint. Decryption algorithms may be used in tandem with this approach to increase security.

Multiple communication channels may currently be available to many users who carry a smartphone while working on a primary computing device. For example, a laptop may use a WiFi network connected to a fiber optic transmission line to form a primary communication channel while a smartphone may use a cellular communication network to form a secondary communication channel. The laptop and smartphone may form a network to communicate the primary and/or secondary data stream for further processing. The laptop may also transmit information to a server using the secondary communication channel of the cell phone.

Such configurations may prevent hackers from deciphering the transmitted communications by distributing key elements of the communication via two or more communication channels. For example, an MITM attack may be thwarted by such a configuration.

With reference to FIG. 1, a system 100 for conducting secure data transmission using multi-channel communication is illustrated in accordance with a non-limiting embodiment of the present disclosure. System 100 includes a server 10, a computing device 50 and a computing device 60. For example, computing device 50 may be a personal computer or laptop, while computing device 60 may be a smart phone that may be tethered to computing device 50 via a universal serial bus ("USB") connection. Server 10 includes memory 20, hard disk 30 and processors 32 running a multi-channel communication process in memory 20. Server 10 also includes interface 34 and input/output 36. Server 10 and computing device 50 communicate through network 40 over communication channel 52, while server 10 and computing device 60 communicate through network 40 over communication channel 62.

In certain embodiments multi-channel communication process 22 receives a request to initiate confidential communications from computing device 50. For example, a user wishes to log in to an online retail website. The user accesses the login page and may be notified that a verification code will be sent to computing device 60, which may be a smart phone. Server 10 may send the verification code to computing device 60 via communication channel 62. Computing device 60 may be running an application that connects to computing device 50 and transmits the verification code to computing device 50. For example, computing device 50 and computing device 60 may be connected via a USB connection to enable communication between the two devices. Computing device 50 may then transmit the verification code through communication channel 52 to server 10. Secure communications may then take place between computing device 50 and server 10 using both communication channel 52 and communication channel 62. For example, computing device 50 may break apart an encrypted message into two data streams. The first data stream may be transmitted through communication channel 52 to server 10. The second data stream may be transmitted from computing device 50 to computing device 60 and then through communication channel 62 to server 10. Thus, listener 70 may only receive a portion of the encrypted message. In certain embodiments, public keys may be sent via communication channel 62. Thus, listener 70 may be unable to effectively decode the portion of the encrypted message being transmitted via communication channel 52. Accordingly, an attempted attack may be thwarted by system 100.

In certain embodiments communication channel 52 includes various links, each having distinct communication protocols. For example, communication channel 52 may include a WiFi connection to a cable transmission line. The cable transmission line may connect to many routers, hubs, and switches before being connected to an internet backbone connection and being routed to server 10. As another example, communication channel 52 includes a wired Ethernet connection to a fiber optic network. Those of ordinary skill in the art will appreciate that numerous other connection configurations can make up communication channel 52. For example, any combination of hubs, routers, switches, transmission lines, and wireless transmission media may be used to create a communication channel 52.

In certain embodiments, communication channel 62 also includes various links with distinct communication protocols. For example, a radio wireless communication standard, such as long term evolution ("LTE") may connect computing device 60 to network 40 and server 10. Those of ordinary skill in the art will appreciate that numerous other connection configurations can make up communication channel 62. For example, any combination of hubs, routers, switches, transmission lines, and wireless transmission media may be used to create a communication channel 62.

In certain embodiments, an organization may require computing device 60 to connect to server 10 via a separate communication channel. For example, an application running on computing device 60 may turn off an embedded wireless access card and force the device to communicate via a cellular network while secure communications are being transmitted. Thus, system 100 may ensure that distinct communication channels 52 and 62 exist before conveying or accepting any secure transmissions.

In certain embodiments, computing devices 50 and 60 may be any devices capable of communicating via network 40 with server 10. For example, computing device 50 may include a laptop computer, desktop computer, cell phone, tablet, personal digital assistant, embedded system, or the like. In one configuration, a tablet may connect to a personal computer via a USB cord. In certain embodiments, a user provides the connection between the two devices. In this example, a verification code may be transmitted from one device to another device for use in authentication of the user. In certain embodiments, an ad-hoc network may be established between the devices. For example, a blue-tooth connection may connect computing device 50 and 60.

In certain embodiments, many more computing devices having distinct communication channels may be used in addition to computing devices 50 and 60. For example, system 100 may scale to use 5 computing devices with distinct communication channels.

Authentication and data transmission processes may utilize the distinct communication channels of each of these devices in order to increase the available bandwidth for transmitting messages. In certain embodiments, the distribution of the content being transmitted may be scaled based on available bandwidth of each communication channel. For example, if one channel lacks bandwidth to convey a large message, the communication channel with the larger bandwidth capacity may transmit a greater volume of the secure message. In certain embodiments, the low bandwidth communication channel may carry only public key information or other decryption information while the higher bandwidth communication channel may carry the message.

In certain embodiments, other specialized encryption and ciphering techniques may be developed for special use in multi-channel communications. For example, ciphering techniques dependent on information conveyed in the opposite communication channel may be employed in certain embodiments of the present disclosure. Those of ordinary skill in the art will appreciate the numerous encryption techniques available that may be employed in system 100.

Figure 2:
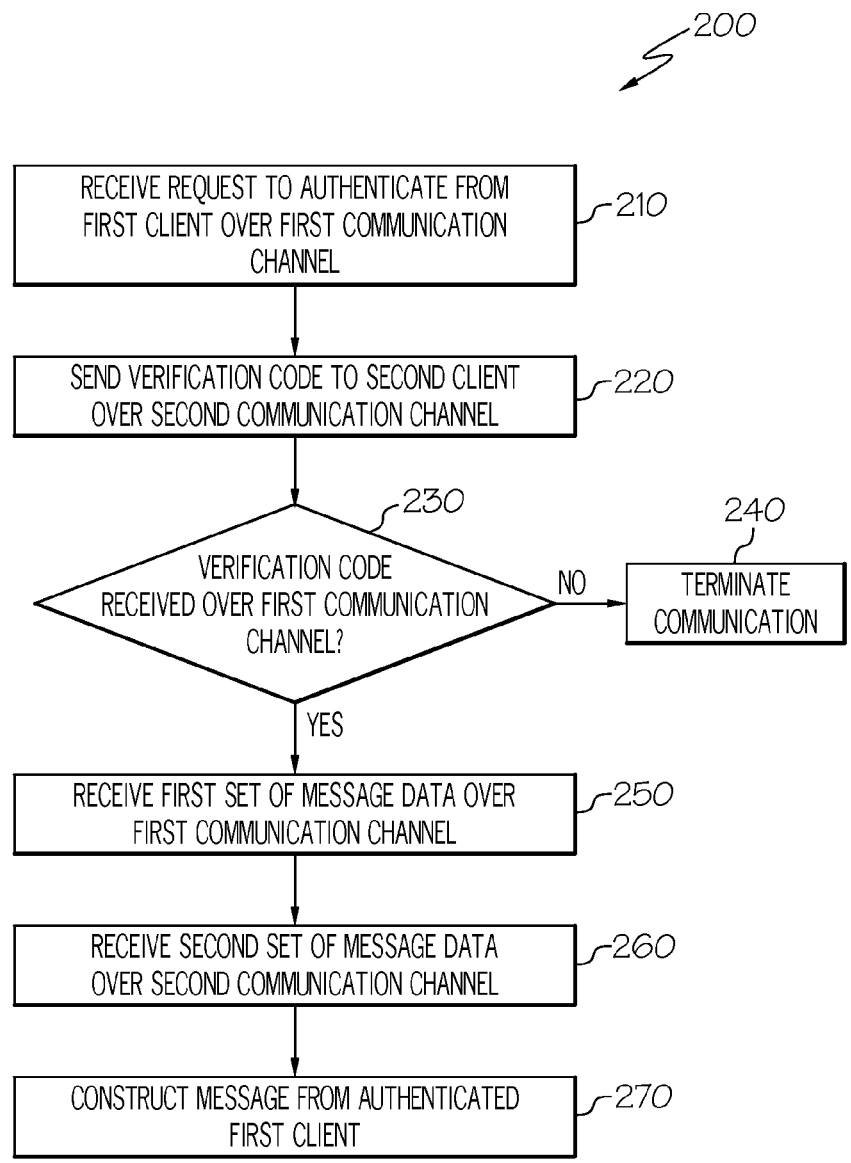
FIG. 2 illustrates a flow chart of a method for secure data transmission using multi-channel communication in accordance with a non-limiting embodiment of the present disclosure.

With reference to FIG. 2, a method for secure data transmission using multi-channel communication is illustrated in accordance with a non-limiting embodiment of the present disclosure. At step 210, a request to initiate secure data transmission is sent to a server from a first client over a first communication channel. For example, a client computing device, such as a laptop or personal computer, accesses a login page of a website. In certain embodiments, the website may prompt the user to enter authenticating information. For example, the website may prompt the user to enter a verification code, as well as a username and password. Other authenticating information may also be requested by the website.

At step 220, a verification code may be sent to a second client over a second communication channel. In certain embodiments, the second client may be a second computing device that the user of the first client has access to. For example, the second client may be a smart phone of the user. As another example, the second client may be a second laptop, personal computer, tablet, or the like.

In certain embodiments, the user may register the second client with the website. For example, during registration, a user may enter a cell phone number for use during authentication and/or user verification procedures. The cell phone may be used when communicating with the website through any unestablished communication channel, or from any unfamiliar IP address.

In certain embodiments, the server serving the website, or another computing device affiliated with the website may send a verification code to the second client over a second communication channel. For example, the second client may be a smartphone with a mobile network connection or a connection to a cellular network. The server may send a text message (e.g., a short message service or SMS) message to the smartphone. The text message may include a verification code. The user may enter the verification code into a website prompt.

In certain embodiments, the server may send the verification code to the second client via a cellular data communication network. For example, the smartphone may have an LTE communication network connection for connecting to the internet.

In certain embodiments, the smartphone may have a process or application running that communicates with the server. For example, in the above verification example, the application running on the smartphone may receive the verification code via the LTE communication network. As another example, a service running on the second client may receive the verification code, and other communications from the server.

In certain embodiments, the second client may establish a local network with the first client. For example, the second client may establish an ad-hoc network with the first client using a bluetooth or WiFi network. As another example, a network is created between the devices using the USB ports of each device. The second client may transmit data received from the server to the first client using this network.

At step 230, the first client communicates the verification code to the website and/or authenticating server. In certain embodiments, this may be an automatic process. For example, a service and/or application running on the first client may receive the verification code from the second device and may automatically transmit the verification code to the proper server to authenticate the user and/or device. In certain embodiments, this may be a manual process, where a user reads the verification code from a prompt on the first or second device.

In certain embodiments, if the server determines that the correct verification code was entered then the user and/or first client may be authenticated. When authentication is complete, secure multi-channel data transmission may begin between the server and the first and/or second client.

However, if the server determines that the authentication process was not completed, the server may terminate communication with the first client at step 240. For example, if the server determines that the verification code was not entered within a predetermined time window, or that the incorrect verification code was entered, then the server may terminate communication with the first client.

In certain embodiments, public keys may be shared between the first client, second client and the server. The public keys may be transmitted to each counterparty via multi-channel communication. For example, the server may send a public key required to decipher or decrypt its messages to the first client. The server may accomplish this by splitting the public key into several data streams.

In certain embodiments, each public key data stream may be sent over a separate communication channel. For example, part of the public key may be sent over the first communication channel to the first client, while the remainder may be sent over the second communication channel to the second client. The second client may then pass the public key information to the first client via the ad-hoc or local network connection to the first client. Thus, an eavesdropper listening in on one communication channel may not capture the entire public key. Without the public key information, a MITM attacker may not be able to pose as each opposing node's counterparty.

In certain embodiments, public key information is passed via one dedicated communication channel. For example, the public key information may be passed on the second communication channel. The second client may transfer the public key information to the first client. MITM attacks may be thwarted using this approach as well because the attacker may have access only to one communication channel, where access to both the public key channel and the encrypted message channel is required.

At step 250, the server receives a first set of message data over the first communication channel. For example, the server may send a response to the client indicating that secure transmission of data may begin after the authentication stage has completed. The first client may begin to process a message to transmit to the server. For example, the message may be packets of data that form a document. As another example, the message may be another type of file or communication. Those of ordinary skill in the art will appreciate the wide variety of other uses for the data sent in these embodiments.

At step 260, the server receives a second set of message data over the second communication channel. In certain embodiments, the first client may encrypt the message. The encrypted message may then be broken apart based on a predetermined algorithm. Part of the encrypted message may be sent by the first client over the first communication channel. The rest of the encrypted message may be sent by the second client over the second communication channel. The server may receive and reassemble each portion of the message and reassemble the encrypted message. The server may then decipher the encrypted message.

In certain embodiments, no encryption of the message takes place. For example, the first client may directly break up the message into first and second data streams. The data streams may be transferred over respective communication channels to the server. The server may reassemble the data streams to create the message.

At step 270, the original message is reconstructed at the server. The server may take further steps to decrypt and/or decipher the reassembled message.

Figure 3:
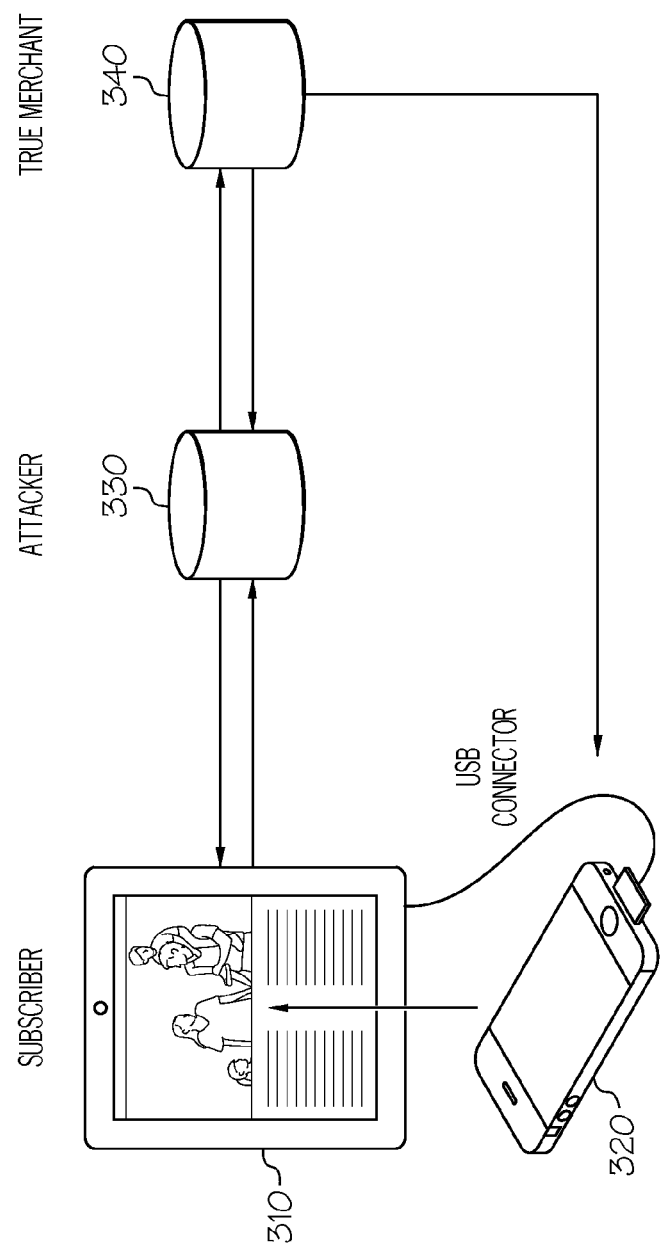
FIG. 3 illustrates a block diagram of a system for secure data transmission using multi-channel communication during a man-in-the-middle attack.

With reference to FIG. 3, a block diagram of a system for transmitting secure data using multi-channel communication is illustrated thwarting an MITM attack. A user uses tablet 310 to log into a secure site's server 340. An attacker 330 poses as the merchant server 340 to the tablet 340, while posing as the tablet client to the merchant server 340. Normally, if attacker 330 captured each party's public keys, it could transmit its own public keys to the tablet and server respectively. However, the multi-channel communication system frustrates attacker 30 by transmitting key data via smartphone 320's distinct communication channel.

With reference to FIG. 4, a sequence diagram of a system for transmitting secure data using multi-channel communication is illustrated. The sequence diagram illustrates example steps for each of a subscriber to a service, the attacker, and the service provider merchant.

In certain embodiments, communication channels may refer to physical transmission medium, such as wires, cables, or other physical signal carrying medium, or wireless communication medium such as radio signals or electromagnetic wave signals.

Certain embodiments of system 100 may utilize emerging communication technologies. For example, system 100 may utilize wireless binding of parallel data streams. Such communication technologies may be leveraged in order to combat attempted MITM attacks.

In certain embodiments, a single device may establish distinct communication channels, such as communication channels 52 and 62. For example, a personal computer with a WiFi network connection and a 4G LTE connection may communicate sensitive information using each distinct communication channel. One process may act as computing device 50 and one process may act as computing device 60. Thus, listener 70 may still only be able to access to one communication channel from the single device.

Such a configuration may be suitable for use in embodiments of the present disclosure. For example, the IP address of the single device may control how packets are routed to the device. However, in certain embodiments, multiple communication channels may be established between server 10 and the single device for receiving data. For example, a single device may use several IP addresses by using proxies or other networking techniques.

In certain embodiments, the teachings of the present disclosure may enable secure authentication between a user and a service provider. In certain embodiments, the teachings of the present disclosure may increase the security of private messages transmitted between parties.

As an example, consider a user who wishes to view a secure document that is stored online. The user may have access two computing devices, such as a cell phone and a laptop. The two computing devices may be capable of communicating via communication protocols and/or channels. In certain embodiments, the two computing devices may communicate via separate communication protocols. For example, the two devices may be capable of communicating with the internet via different frequency bands or wireless spectra. As another example, the two devices may be capable of communicating via different communication protocols, such as WiFi or Long Term Evolution ("LTE"). In this example, a cell phone may have an LTE internet connection while the laptop may be connected to the internet via WiFi networking card.

In certain embodiments, other computing and/or communication devices may be used in system 100. For example, one or more of a phone, smart phone, personal digital assistant ("PDA"), tablet, laptop, or any other device capable of communicating via a network may be used in accordance with the teachings of the present disclosure.

In certain embodiments, two communication devices are connected together such that they may communicate with each other. The communication devices may maintain distinct connections to another network. For example, a smart phone and a tablet may be connected via a Universal Serial Bus ("USB") connection. The smartphone may be connected to a GSM cellular network while the tablet may be connected to the internet via a WiFi connection.

In certain embodiments, other local signaling technologies may be used. For example, Bluetooth, local WiFi, ultra-wide band and/or other signaling solutions may be used. In certain embodiments, a QR code display and scanner may be used. For example, one device may display a QR code and the other device may scan the QR code with the camera.

In certain embodiments, scanning the QR code may enable system 100 to authenticate a user. For example, a service provider may send a QR code to a cell phone as a means of verifying that the user accessing their page via a new device has access to a cell phone that is registered to the user. While an identity thief may have access to the cell phone, it is at least less likely that the identity thief will have access to the cell phone.

In certain embodiments, a user may browse to a website to initiate a two-factor authentication process. For example, the two-factor authentication process may authenticate a user by first requiring the user to enter a password. The web server may respond to the user entering the correct password by sending a one-time password ("OTP") to the user's cell phone via a text message, e.g., short message service ("SMS") or multimedia messaging service ("MMS").

In certain embodiments, instead of manually entering the OTP, the devices may automatically communicate the OTP to each other. For example, the cell phone may be connected to a tablet via a wireless or wired connection. The user may use the tablet to access a secure web site. When the tablet accesses the secure website, the web server may send an OTP to the cell phone. The cell phone may receive the OTP and automatically send the OTP to the tablet via the wireless or wired connection.

In certain embodiments, a service and/or application running on a first device may receive the OTP and automatically send the OTP to a service and/or application running on a second device. The second device may receive the password and communicate receipt back to the web server. Thus, system 100 may provide an automated method for user authentication using a two-factor authentication process.

In certain embodiments, such an automated method may allow use of a forced-latency interlock protocol, or its equivalent. Thus, the automated two-factor authentication process may detect and/or prevent MITM attacks.

In certain embodiments, when authentication is complete, the user may interact with the website as an authenticated user. The teachings of the present disclosure may enable secure communication of these interactions. For example, requests and responses sent to and received from the website may be communicated via two or more communication channels. Thus, a hacker may have to intercept packets being transmitted on two separate communication channels in order to reconstruct the original messages. Coupled with other encryption protocols, such interception and reconstruction may be more difficult than by using existing techniques.

In certain embodiments, the communication channels may be available via one or more devices. For example, a laptop may have a wireless network interface card, as well as an LTE internet connection. As another example, the communication channels may be available via two separate devices connected via a wireless or wired connection.

In certain embodiments, associated public keys for decryption may also be sent via two or more communication channels. For example, public keys for use with private keys at each respective location may be sent over separate communication channels and reconstructed at the target location for decrypting a message.

In certain embodiments, one communication channel may be used to communicate encrypted communications, while another channel may be used to communicate public keys. Hackers may require many example public keys in order to determine the private key and decrypt the secret message. Thus, if the hacker does not have access to the second communication channel used for transporting the public keys, the hacker may be prevented from determining the private key for decrypting the encrypted message.

As another example, the hacker may only have access to the public key communication channel. In this embodiment the hacker would be unable to decrypt any secret messages being transmitted because the hacker may not have access to the encrypted messages transmitted via the second communication channel.

Those of ordinary skill in the art will appreciate the orders of magnitude and complexity that extension of the teachings of the present disclosure may enable. For example, public keys may be broken into sub-streams and communicated via several different communication channels. The public keys may also be encrypted. In certain embodiments, the messages may be broken up into sub-streams and communicated via several different communication channels. For example, sub-streams of various unencrypted and encrypted messages may be transmitted via four communication channels. A hacker must have access to each of the four communication channels in order to decrypt the message.

The teachings of the present disclosure may frustrate MITM attacks by spreading secret communications over various communication channels. The MITM attacks may be frustrated because all communication channels may not be known by traditional MITM attackers.

In certain embodiments, the size of the messages sent via the various communication channels may be throttled in order to increase performance. For example, if bandwidth is low via one communication channel, that channel may be used for transmitting public keys, since message content may have more bandwidth requirements than public key transmission bandwidth requirements.

In certain embodiments, message payload size may be throttled based on available bandwidth. For example, communication channels having low bandwidth may transmit a smaller amount of relative message content than communication channels having higher bandwidth. In these configurations performance may still be increased over using one single communication channel because of the added bandwidth capacity of the low bandwidth communication channel.

For example, if a message being transmitted via system 100 is encrypted, and if bandwidth is relatively low on one communication channel, the lower-bandwidth channel may be used to send a time-varying symmetric key. Different parts of the encrypted message may require a synchronized key for decryption. The encrypted message may be sent through the higher-bandwidth channel in this example. System 100 may assign different parts of the message and key to different communication channels. These assignments may be communicated to the target system and may comprise a part of the reassembly and decryption process.

In certain embodiments, system 100 may be used for symmetric and/or asymmetric cryptography. For example, system 100 may utilize symmetric cryptography to send a key for decrypting a message on a second communication channel, such as communication channel 62. The message may be sent on a first communication channel, such as communication channel 52, contemporaneously with transmission of the key.

In certain embodiments, system 100 may adjust to the location of each device, such that different levels of security may be applied based on where each device is located. The security levels of the available communication channels may also be varied based on the location of each device. For example, if devices used in communicating secret information, such as those illustrated in accordance with system 100, are located on the premises of an organization (i.e., within an organization building or campus perimeter, less secure encryption strategies may be employed, thus increasing bandwidth available for message communication.

In certain embodiments, encryption and security strategy thoroughness may be increased when system 100 determines a device is located in an unsafe area, i.e., an area known for hacking or an area where the system 100 has been attacked from before. For example, certain foreign countries may trigger this security increase. Thus, when it is determined that the device is located in a certain location, even more communication channels may be used to transmit secure messages to the web server.

In certain embodiments, encrypted content may be sent over one channel, while a challenge and/or response dialog may be conducted on the other channel. For example, packets may be signed using a key that was previously installed on a first device. A second device may use a windowing algorithm to produce a series of challenge values. The challenge values may be synchronized so that a third device, i.e., a sending and/or receiving device, may be authenticated. In certain embodiments a user may enter a challenge value from the second device into the sending and/or receiving device. In certain embodiments, the second device and the sending and/or receiving device may communicate via a wireless and/or wired connection so that the challenge values may be continuously checked automatically. The challenge values may then be returned to the server for validation.

In certain embodiments, system 100 may be used to send sensitive information that may only be available for inspection when a second validating user is present and willing to authorize the transaction. For example, some documents may be extremely sensitive to an organization. Each view of these documents may be required to be associated with at least one authorizing agent. System 100 may be used to require an authorizing agent and/or presence of the authorizing agent's computing device in order to access these documents.

In certain embodiments, one device with the capability to communicate via separate communication channels may be used. For example, a device with multiple antennae that are capable of communicating via separate communication channels may be used. As another example, a device may switch communication protocols or maintain two concurrent connection protocols. In certain embodiments, these devices may rapidly switch packets between each communication protocol to increase the privacy of the communicated message by decreasing the ability of a hacker to decrypt the secure communications. For example, the hacker may now have to listen in via two communication protocols in order to intercept all relevant packets for reconstruction and decryption.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
receiving a request to initiate secure communications from a subscriber, the request being transmitted by the subscriber using a first personal device of the subscriber and over a first communication channel, wherein the first personal device comprises a personal computer the secure communications comprise a message stored in a memory of the first personal device;
authenticating the subscriber, the authenticating comprising:
communicating with a second personal device of the subscriber using a second communication channel; and
in response to communicating with the second personal device, receiving a response from the first personal device, the response being transmitted over the first communication channel;
determining whether the first or second communication channel has a higher bandwidth;
transmitting a server's public key over the communication channel with a lower bandwidth;
receiving a first set of message data from the first personal device, the first set of message data being transmitted over the communication channel with the higher bandwidth, wherein the message cannot be determined using the first set of message data alone, and wherein the first set of message data comprises a portion of the message encrypted using the server's public key;
receiving a second set of message data from the second personal device, the second set of message data being transmitted over the communication channel with the lower bandwidth, wherein the message cannot be determined using the second set of message data alone, the second set of message data further comprises a subscriber's public key for encrypting future messages, and wherein a size of the first message data is larger than a size of the second message data;
constructing, using a processor, the message using the first set of message data, the second set of message data, and a private key corresponding to the server's public key.

2. The method of claim 1, further comprising:
encrypting a second message;
determining a third set of message data and a fourth set of message data using the encrypted second message; and
sending the encrypted second message to the first personal device, the sending comprising:
sending the third set of message data to the first personal device over the communication channel with the higher bandwidth; and
sending the fourth set of message data to the second personal device over the communication channel with the lower bandwidth, wherein the third set of message data and the fourth set of message data are configured to be constructed into the second message at the first personal device.

3. The method of claim 1, wherein authenticating the first personal device further comprises:
sending a verification code to the second personal device, the verification code being transmitted over the communication channel with the lower bandwidth;
determining whether the first personal device is authenticated based on whether the verification code is received over the communication channel with the higher bandwidth.

4. The method of claim 1, wherein the first communication channel comprises a transmission line connected to the first personal device, and wherein the second communication channel comprises a cellular data communication service connected to the second personal device.

5. The method of claim 1, further comprising:
determining a security level of the first communication channel;
determining whether the security level is appropriate for using a single-channel communication protocol to transmit a secure message; and
in response to determining that the security level is appropriate, sending the secure message to the first personal device over the first communication channel.

6. The method of claim 1, further comprising:
generating a key, wherein the first set of message data comprises a first portion of an encrypted message associated with the message, the second set of message data comprises a second portion of the encrypted message, and constructing the message further comprises decrypting the encrypted message using the key.

7. A computer configured to access a storage device, the computer comprising:
a processor; and
a non-transitory, computer-readable storage medium storing computer-readable instructions that when executed by the processor cause the computer to perform:
receiving a request to initiate secure communications from a subscriber, the request being transmitted by the subscriber using a first personal device of the subscriber and over a first communication channel, wherein the secure communications comprise a message stored in a memory of the first personal device;
authenticating the subscriber, the authenticating comprising:
communicating with a second personal device of the subscriber using a second communication channel; and
in response to communicating with the second personal device, receiving a response from the first personal device, the response being transmitted over the first communication channel;
determining whether the first or second communication channel has a higher bandwidth;
transmitting a server's public key over the communication channel with a lower bandwidth;
receiving a first set of message data from the first personal device, the first set of message data being transmitted over the communication channel with the higher bandwidth, wherein the message cannot be determined using the first set of message data alone;
receiving a second set of message data from the second personal device, the second set of message data being transmitted over the communication channel with the lower bandwidth, wherein the message cannot be determined using the second set of message data alone, and wherein a size of the first message data is larger than a size of the second message data; and
constructing, using a processor, the message using the first set of message data and the second set of message data.

8. The computer of claim 7, wherein the computer-readable instructions further cause the computer to perform:
encrypting a second message;

determining a third set of message data and a fourth set of message data using the encrypted second message; and sending the encrypted second message to the first personal device, the sending comprising:

sending the third set of message data to the first personal device over the communication channel with the higher bandwidth; and sending the fourth set of message data to the second personal device over the communication channel with the lower bandwidth, wherein the third set of message data and the fourth set of message data are configured to be constructed into the second message at the first personal device.

9. The computer of claim 7, wherein the computer-readable instructions further cause the computer to perform: generating a first public key and a private key, wherein the first set of message data comprises an encrypted message associated with the message, the second set of message data comprises a second public key for encrypting future messages, and constructing the message further comprises decrypting the encrypted message using the private key.

10. The computer of claim 7, wherein authenticating the first personal device further comprises:

sending a verification code to the second personal device, the verification code being transmitted over the communication channel with the lower bandwidth;

determining whether the first personal device is authenticated based on whether the verification code is received over the communication channel with the higher bandwidth.

11. The computer of claim 7, wherein the first communication channel comprises a transmission line connected to the first personal device, and wherein the second communication channel comprises a cellular data communication service connected to the second personal device.

12. The computer of claim 7, wherein the computer-readable instructions further cause the computer to perform:

determining a security level of the first communication channel;

determining whether the security level is appropriate for using a single-channel communication protocol to transmit a secure message; and in response to determining that the security level is appropriate, sending the secure message to the first personal device over the first communication channel.

13. The computer of claim 7, wherein a single computing device comprises the first personal device and the second personal device, the single computing device configured to communicate over the first communication channel and the second communication channel.

14. The computer of claim 7, wherein the computer-readable instructions further cause the computer to perform:

generating a key, wherein the first set of message data comprises a first portion of an encrypted message associated with the message, the second set of message data comprises a second portion of the encrypted message, and constructing the message further comprises decrypting the encrypted message using the key.

15. A computer program product comprising:

a computer-readable storage medium having computer-readable program code embodied therewith, the computer-readable program code comprising:

computer-readable program code configured to receive a request to initiate secure communications from a first subscriber, the request being transmitted by the subscriber using a first personal device of the subscriber and over a first communication channel, wherein the secure communications comprise a message stored in a memory of the first personal device;

computer-readable program code configured to authenticate the subscriber, the authenticating comprising:

communicating with a second personal device using a second communication channel; and in response to communicating with the second personal device, receiving a response from the first personal device, the response being transmitted over the first communication channel;

computer-readable program code configured to determine whether the first or second communication channel has a higher bandwidth;

computer-readable program code configured to transmit a server's public key over the communication channel with a lower bandwidth;

computer-readable program code configured to receive a first set of message data from the first personal device, the first set of message data being transmitted over the communication channel with the higher bandwidth, wherein the message cannot be determined using the first set of message data alone;

computer-readable program code configured to receive a second set of message data from the second personal device, the second set of message data being transmitted over the communication channel with the lower bandwidth, wherein the message cannot be determined using the second set of message data alone, and wherein a size of the first message data is larger than a size of the second message data; and computer-readable program code configured to construct, using a processor, the message using the first set of message data and the second set of message data.

16. The computer program product of claim 15, wherein the computer-readable program code further comprises:

computer-readable program code configured to encrypt a second message;

computer-readable program code configured to determine a third set of message data and a fourth set of message data using the encrypted second message; and computer-readable program code configured to send the encrypted second message to the first personal device, the sending comprising:

sending the third set of message data to the first personal device over the communication channel with the higher bandwidth; and sending the fourth set of message data to the second personal device over the communication channel with the lower bandwidth, wherein the third set of message data and the fourth set of message data are configured to be constructed into the second message at the first personal device.

17. The computer program product of claim 15, wherein the computer-readable program code further comprises:

computer-readable program code configured to generate a first public key and a private key, wherein the first set of message data comprises an encrypted message associated with the message, the second set of message data comprises a second public key for encrypting future messages, and constructing the message further comprises decrypting the encrypted message using the private key.

18. The computer program product of claim 15, wherein authenticating the first personal device further comprises:

sending a verification code to the second personal device, the verification code being transmitted over the communication channel with the lower bandwidth;

determining whether the first personal device is authenticated based on whether the verification code is received over the communication channel with the higher bandwidth.

19. The computer program product of claim 15, wherein the first personal device comprises a personal computer of a user and the second personal device comprises a smart phone of the user and further comprising computer-readable program code configured to couple the personal computer and the smart phone using a third communication channel that comprises a USB connection.

20. The method of claim 1, wherein the first and second sets of message data do not travel across any common communication paths between network nodes during any transmission to the first and second personal devices.

* * * * *